(12) United States Patent
Georgis et al.

(10) Patent No.: US 8,751,662 B2
(45) Date of Patent: Jun. 10, 2014

(54) SYSTEM AND METHOD FOR EFFECTIVELY OPTIMIZING CONTENT SEGMENT DOWNLOADS IN AN ELECTRONIC NETWORK

(75) Inventors: Nikolaos Georgis, San Diego, CA (US); Djung Nguyen, San Diego, CA (US); Paul Hwang, Burbank, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 11/895,253

(22) Filed: Aug. 23, 2007

(65) Prior Publication Data

US 2009/0055461 A1 Feb. 26, 2009

(51) Int. Cl.
*G06F 15/16* (2006.01)
*H04L 29/08* (2006.01)

(52) U.S. Cl.
CPC .................................. *H04L 67/10* (2013.01)
USPC ....................................................... 709/227

(58) Field of Classification Search
CPC ...................................................... H04L 67/10
USPC ....................................................... 709/227
See application file for complete search history.

(56) References Cited

U.S. PATENT DOCUMENTS

| | | | |
|---|---|---|---|
| 6,772,209 B1 | 8/2004 | Chernock et al. | |
| 7,155,735 B1 | 12/2006 | Ngo et al. | |
| 7,165,095 B2 | 1/2007 | Sim | |
| 2002/0162109 A1 | 10/2002 | Shteyn | |
| 2003/0187853 A1 | 10/2003 | Hensley et al. | |
| 2003/0227487 A1* | 12/2003 | Hugh | 345/777 |
| 2005/0076123 A1 | 4/2005 | Hamadi | |
| 2005/0216473 A1 | 9/2005 | Aoyagi et al. | |
| 2006/0072505 A1* | 4/2006 | Carrillo et al. | 370/331 |
| 2006/0190615 A1* | 8/2006 | Panwar et al. | 709/231 |

FOREIGN PATENT DOCUMENTS

WO WO2005/121965 A2 12/2005

OTHER PUBLICATIONS

Tianying Chang and Mustaque Ahamad, Improving Service Performance Through Object Replication in Middleware: A Peer-to-Peer Approach, 2005, College of Computing, Georgia Institute of Technology, pp. 1-8.
Bong-Jun Ko and Dan Rubenstein, Distributed Self-Stabilizing Placement of Replicated Resources in Emerging Networks, IEEE/ACM Transactions on Networking, vol. 13, No. 3 Jun. 2005, pp. 476-487.

(Continued)

*Primary Examiner* — Jerry Dennison
(74) *Attorney, Agent, or Firm* — Gregory J. Koerner; Redwood Patent Law

(57) ABSTRACT

A system and method for optimizing content distribution in an electronic network includes a peer-to-peer network of client devices. The client devices are initially preloaded in a distributed manner with various content segments from corresponding content items. An optimization module from a tracking server iteratively redistributes said content segments among the client devices to seek an optimal content segment configuration of said content segments for optimizing performance characteristics of content reassembly procedures. When a system user selects a particular content item on a corresponding electronic device, a download manager of the electronic device may automatically generate content segment requests to other appropriate electronic devices in the peer-to-peer network. The download manager may then download and automatically reassemble the content segments to produce the selected content item for utilization by the system user.

3 Claims, 12 Drawing Sheets

(56) References Cited

OTHER PUBLICATIONS

Yan Chen, Randy H. Katz and John D. Kubiatowicz, Dynamic Replica Placement for Scalable Content Delivery, 2002, University of California at Berkeley, pp. 1-6.

Tim Wauters, Jan Coppens, Thijs Lambrecht, Bart Dhoedt, and Piet Demeester, Distributed Replica Placement Algorithms for Peer-to-Peer Content Distribution Networks, 29th Euromicro Conference (Euromicro'03), 2003, p. 181.

* cited by examiner

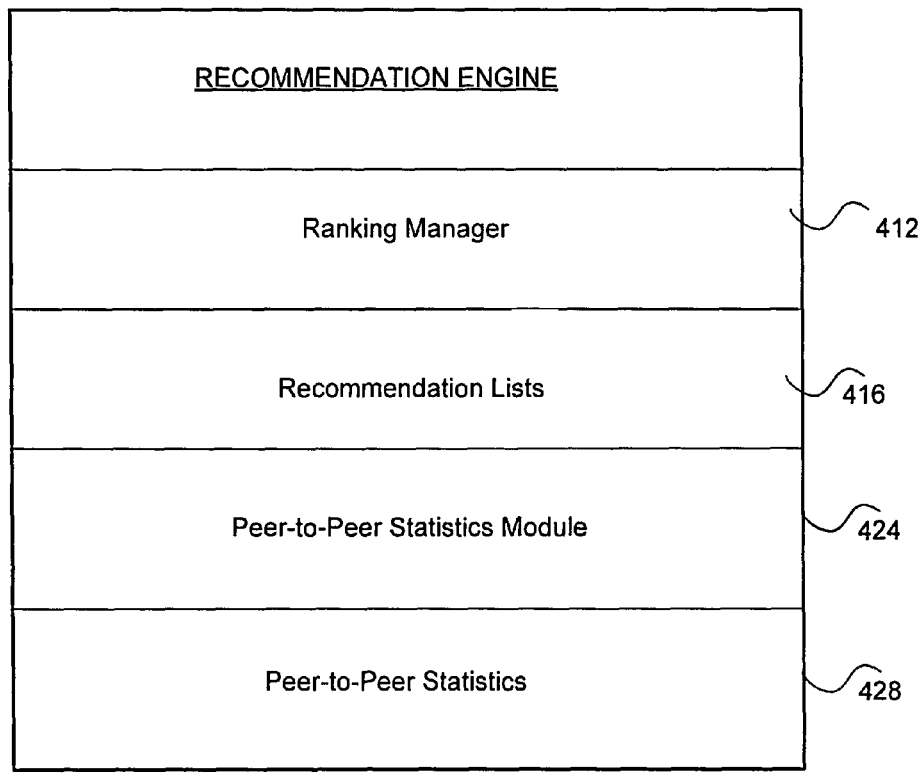
332  FIG. 4A

SYSTEM AND METHOD FOR EFFECTIVELY OPTIMIZING CONTENT SEGMENT DOWNLOADS IN AN ELECTRONIC NETWORK

BACKGROUND SECTION

1. Field of the Invention

This invention relates generally to techniques for managing electronic information, and relates more particularly to a system and method for effectively optimizing content segment downloads for client devices in an electronic network.

2. Description of the Background Art

Implementing effective methods for managing electronic information is a significant consideration for designers and manufacturers of contemporary electronic devices. However, effectively managing information utilized by devices in an electronic network may create substantial challenges for system designers. For example, enhanced demands for increased device functionality and performance may require more system processing power and require additional software resources. An increase in processing or software requirements may also result in a corresponding detrimental economic impact due to increased production costs and operational inefficiencies.

Furthermore, enhanced device capability to perform various advanced data management operations may provide additional benefits to a system user, but may also place increased demands on the control and management of various system components. For example, an enhanced electronic network device that effectively manages electronic content information may benefit from an effective implementation because of the large amount and complexity of the digital data involved.

Due to growing demands on system resources and substantially increasing data magnitudes, it is apparent that developing new techniques for managing information in electronic networks is a matter of concern for related electronic technologies. Therefore, for all the foregoing reasons, developing effective techniques for managing information in electronic networks remains a significant consideration for designers, manufacturers, and users of contemporary electronic devices.

SUMMARY

In accordance with the present invention, a system and method for optimizing content distribution in an electronic network are disclosed. In one embodiment, a tracking server or other appropriate entity initially gathers network statistics regarding client devices in a peer-to-peer network. The network statistics may be any relevant information, including data transfer speeds between the various client devices and content download fees for obtaining content items from an external content source. In certain embodiments, a recommendation engine may be utilized to generate one or more recommendation lists to recommending likely content items for selection by the client devices.

Various content segments from the content items may be preloaded onto the client devices in a distributed manner. An optimization module of the tracking server or other entity may determine an initial content segment distribution for the various content segments stored, on client devices in the peer-to-peer network. Based upon the current content segment distribution and the previously-determined network statistics, the optimization module may then calculate a network cost function to quantify the current state of client devices with respect to performing content segment reassembly procedures to produce complete content items from the distributed content segments.

The optimization module may then select and apply one or more previously defined perturbation functions to the distributed content segments on the client devices to produce a new content segment configuration of content segments on the client devices. The optimization module may then calculate a new network cost function based upon the current redistributed configuration of content segments on the client devices. The optimization module next compares the newly-calculated network cost function with the immediately preceding network cost function.

In particular, the optimization module evaluates the type of change (increasing or decreasing) in the current network cost function. If the newly-calculated network cost function has decreased with respect to the immediately preceding network cost function, then the optimization module accepts the new distribution of content segments on the client devices. The optimization module next determines whether the optimization process is complete by utilizing pre-defined stopping criteria. If the optimization process is not complete, then the optimization process iteratively returns to apply and evaluate additional perturbation functions and resulting content segment distributions. Alternately, if the optimization process is complete, then the optimization process may terminate.

However, if a newly-calculated network cost function has increased, then the optimization module calculates an acceptance probability value based upon predefined acceptance factors. The optimization module evaluates the acceptance probability value to determine whether to accept the new distribution of content segments on the client devices (even though the network cost function has increased). If the current acceptance probability is not acceptable, then the optimization process iteratively returns to apply and evaluate additional perturbation functions.

Alternately, if the acceptance probability is acceptable, then the optimization module accepts the new distribution of content segments on the client devices. The optimization module then determines whether the optimization process is complete by utilizing the pre-defined stopping criteria. If the optimization process is not complete, then the optimization process iteratively returns to apply and evaluate additional perturbation functions. Alternately, if the optimization process is complete, then the optimization process may terminate. For at least the foregoing reasons, the present invention therefore provides an improved system and method for effectively optimizing content segment downloads in an electronic network.

BRIEF DESCRIPTION OF THE DRAWINGS

FIG. 4A is a diagram for one embodiment of the recommendation engine of FIG. 3, in accordance with the present invention;

DETAILED DESCRIPTION

The present invention relates to an improvement in electronic information management techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Therefore, the present invention is not intended to be limited to the embodiments shown, but is to be accorded the widest scope consistent with the principles and features described herein.

The present invention comprises a system and method for optimizing content distribution in an electronic network includes a peer-to-peer network of client devices. The client devices are initially preloaded in a distributed manner with various content segments from corresponding content items. An optimization module from a tracking server iteratively redistributes said content segments among the client devices in accordance with network cost functions to seek an optimal content segment configuration of said content segments for optimizing performance characteristics of subsequent content reassembly procedures. When a system user selects a particular content item on a corresponding electronic device, a download manager of the electronic device may automatically generate content segment requests to other appropriate electronic devices in the peer-to-peer network. The download manager may then download and automatically reassemble the content segments to produce the selected content item for utilization by the system user.

Figure 1A:
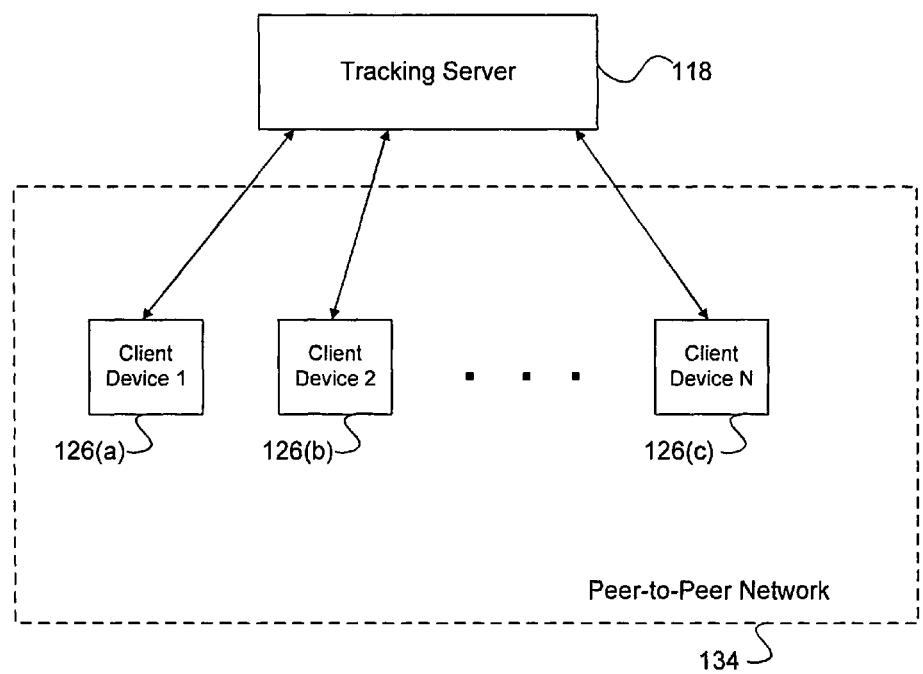
FIG. 1A is a block diagram of an electronic network, in accordance with one embodiment of the present invention.

Referring now to FIG. 1A, a block diagram of an electronic network 110 is shown, in accordance with one embodiment of the present invention. In the FIG. 1A embodiment, electronic network 110 may include, but is not limited to, a tracking server 118, and a plurality of client devices 126. In alternate embodiments, electronic network 110 may be implemented by utilizing components and configurations in addition to, or instead of, certain of those components and configurations discussed in conjunction with the FIG. 1A embodiment.

In accordance with the present invention, any desired number of client devices 126 may be configured in a peer-to-peer network 134 that is further discussed below in conjunction with FIG. 1B. In the FIG. 1A embodiment, client devices 126 may include an electronic device 1 (126(a)) through an electronic device N 126(c). In the FIG. 1A embodiment, each of the client devices 126 may bi-directionally communicate directly with other ones of the client devices 126 by utilizing any appropriate peer-to-peer communication techniques or other effective communication methods.

In accordance with the present invention, some or all of the client devices 126 may be advantageously preloaded with content segments of various pre-determined content items. The content items may include any desired types of electronic information. For example, content items may include, but are not limited to, entertainment programming, movies, video data, audio data, digital photographs, still image data, graphics, web pages, program guide information, and various types of software programs, etc.

System users may thus perform appropriate content reassembly procedures through peer-to-peer network 134 to reassemble and utilize desired content items. In the FIG. 1A embodiment, tracking server 118 may be implemented in any effective manner to track the current locations of the various content segments, and to support optimized content segment downloads by performing appropriate content segment redistribution procedures. One implementation for tracking server 118 is further discussed below in conjunction with FIGS. 2-3. Additional details regarding the foregoing content segment redistribution procedures are further discussed below in conjunction with FIGS. 8-9.

Figure 1B:
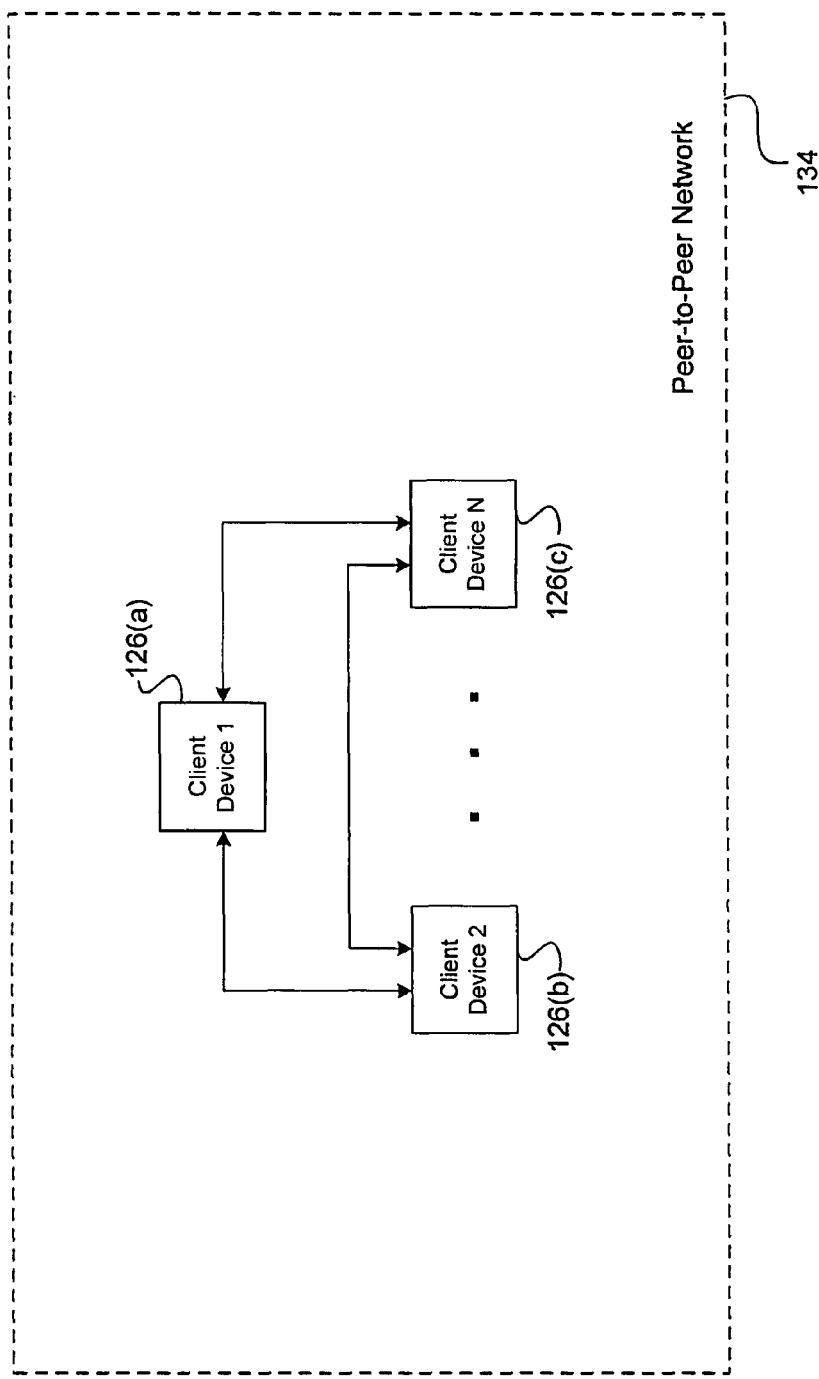
FIG. 1B is a block diagram of the peer-to-peer network of FIG. 1A, in accordance with one embodiment of the present invention.

Referring now to FIG. 1B, a block diagram of the FIG. 1A peer-to-peer network 134 is shown, in accordance with one embodiment of the present invention. The FIG. 1B embodiment includes a client device 1 (126(a)), a client device 2 (126(b)), through a client device N (126(a)). In alternate embodiments, peer-to-peer network 134 may be implemented by utilizing components and configurations in addition to, or instead of, certain of those components and configurations discussed in conjunction with the FIG. 1B embodiment. Furthermore, peer-to-peer network 134 may be implemented to include any desired number of client devices 126.

In the FIG. 1B embodiment, each of the client devices 126 may bi-directionally communicate directly with any other of the client devices 126 by utilizing any desired peer-to-peer communication techniques or other effective communication methods. For example, client device 1 (126(a)) may bi-directionally communicate directly with either client device 2 (126(b)) or client device N (126(c)). Similarly, client device 2 (126(b)) may bi-directionally communicate directly with client device N (126(c)). Furthermore, in the FIG. 1B embodiment, any of the client devices 126 in peer-to-peer network 134 may perform a peer-to-peer content transfer procedure to download content segments from any of the other client devices 126 in peer-to-peer network 134. Additional details regarding the utilization of the FIG. 1B peer-to-peer network 134 are further discussed below in conjunction with FIGS. 8-9.

Figure 2:
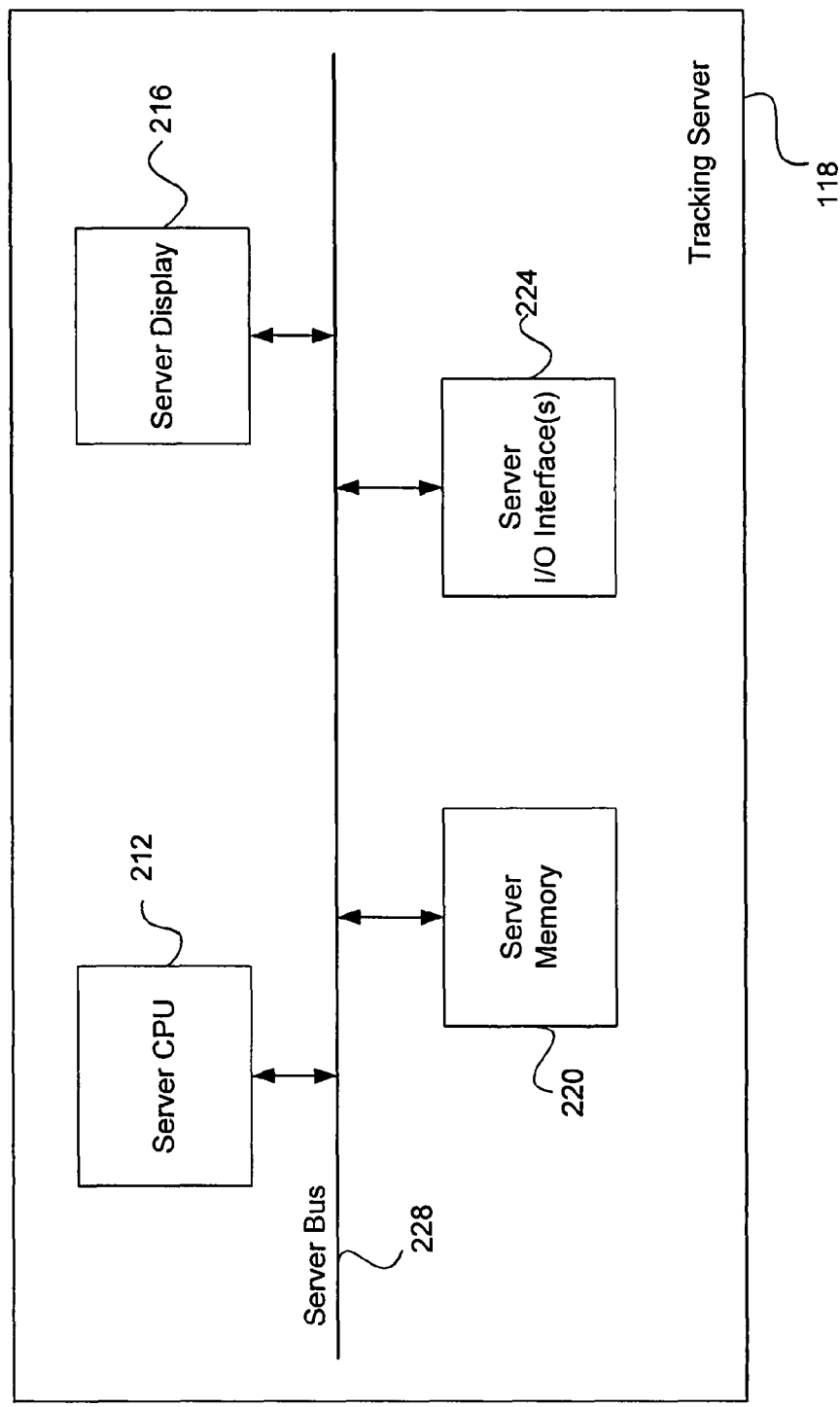
FIG. 2 is a block diagram for one embodiment of the tracking server of FIG. 1, in accordance with the present invention.

Referring now to FIG. 2, a block diagram for one embodiment of the FIG. 1A tracking server 118 is shown, in accordance with the present invention. In the FIG. 2 embodiment, tracking server 118 includes, but is not limited to, a server central processing unit (server CPU) 212, a server display 216, a server memory 220, and one or more server input/output interface(s) (server I/O interface(s)) 224. The foregoing components of tracking server 118 may be coupled to, and communicate through, a server bus 228. In alternate embodiments, tracking server 118 may alternately be implemented using components and configurations in addition to, or instead of, certain of those components and configurations discussed in conjunction with the FIG. 2 embodiment.

In the FIG. 2 embodiment, server CPU 212 may be implemented to include any appropriate and compatible microprocessor device that preferably executes software instructions to thereby control and manage the operation of tracking server 118. The FIG. 2 server display 216 may include any effective type of display technology including a cathode-ray-tube monitor or a liquid-crystal display device with an appropriate screen for displaying various information to a server user. In the FIG. 2 embodiment, server memory 220 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of server memory 220 are further discussed below in conjunction with FIG. 3.

In the FIG. 2 embodiment, server I/O interface(s) 224 may include one or more input and/or output interfaces to receive and/or transmit any required types of information by tracking server 118. Server I/O interface(s) 224 may include one or more means for allowing a server user to communicate with tracking server 118. The utilization of tracking server 118 is further discussed below in conjunction with FIGS. 8-9.

Figure 3:
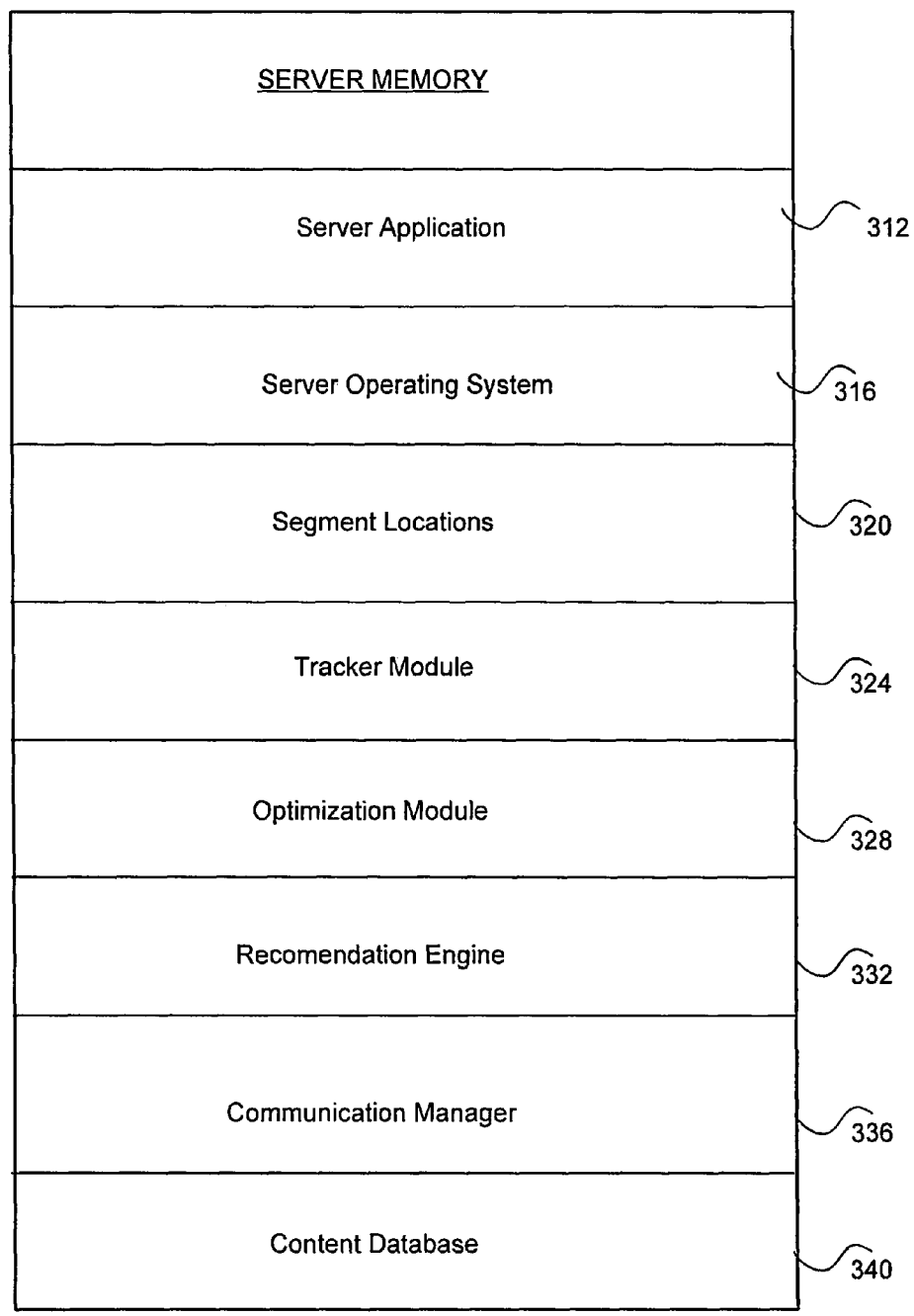
FIG. 3 is a block diagram for one embodiment of the server memory of FIG. 2, in accordance with the present invention.

Referring now to FIG. 3, a block diagram for one embodiment of the FIG. 2 server memory 220 is shown, in accordance with the present invention. In the FIG. 3 embodiment, server memory 220 may include, but is not limited to, a server application 312, a server operating system 316, segment locations 320, a tracker module 324, an optimization module 328, a recommendation engine 332, a communication manager 336, and a content database 340. In alternate embodiments, server memory 220 may include various other components and functionalities in addition to, or instead of, certain those components and functionalities discussed in conjunction with the FIG. 3 embodiment.

In the FIG. 3 embodiment, server application 312 may include program instructions that are preferably executed by server CPU 212 (FIG. 2) to perform various functions and operations for tracking server 118. The particular nature and functionality of server application 312 typically varies depending upon factors such as the specific type and particular functionality of the corresponding tracking server 118. Server operating system 316 may perform various low-level functions for tracking server 118.

In the FIG. 3 embodiment, segment locations 320 may include any appropriate type of tracking information to specify or track the current locations of individual content segments that are subsets of corresponding whole content items. For example, a given content item (such as a movie) may be subdivided into a specified number of corresponding content segments. These content segments may then be individually preloaded onto different ones of the client devices 126 (FIG. 1A). Segment locations 320 may include, but is not limited to, the current storage locations of the various content segments. In certain embodiments, segment locations 320 may include unique content segment identifiers that are associated with corresponding client device identifiers that represent the respective client devices 126 on which the content segments are stored.

In the FIG. 3 embodiment, tracker module 324 may monitor any transfers of content items between the various client devices 126. Tracker module 324 may then dynamically update segment locations 320 to incorporate any new changes in the current storage locations of the various content segments on client devices 126. In the FIG. 3 embodiment, optimization module 328 may perform appropriate content segment redistribution procedures to optimize content segment downloads between various client devices 126 in peer-to-peer network 134. Additional details with respect to effectively performing the foregoing content segment redistribution procedures are further discussed below in conjunction with FIGS. 8-9.

In the FIG. 3 embodiment, recommendation engine 332 may analyze various types of content recommendation criteria (such as user content-selection histories) to thereby automatically provide recommended content items to system users. One embodiment for recommendation engine 332 is further discussed below in conjunction with FIG. 4. In the FIG. 3 embodiment, communication manager 336 may perform appropriate communication functions with client devices 126 to transfer appropriate content segment information. In the FIG. 3 embodiment, content database 340 may include additional content items for downloading to client devices 126 if necessary. Additional details regarding the operation and implementation of tracking server 118 are further discussed below in conjunction with FIGS. 8-9.

Referring now to FIG. 4A, a diagram for one embodiment of the FIG. 3 recommendation engine 332 is shown, in accordance with the present invention. In the FIG. 4A embodiment, recommendation engine 332 may include, but is not limited to, a ranking manager 412, recommendation lists 416, a peer-to-peer statistics module 424, and peer-to-peer statistics 428. In alternate embodiments, recommendation engine 332 may include other elements and configurations in addition to, or instead of, certain of those elements and configurations discussed in conjunction with the FIG. 4A embodiment.

Figure 4B:
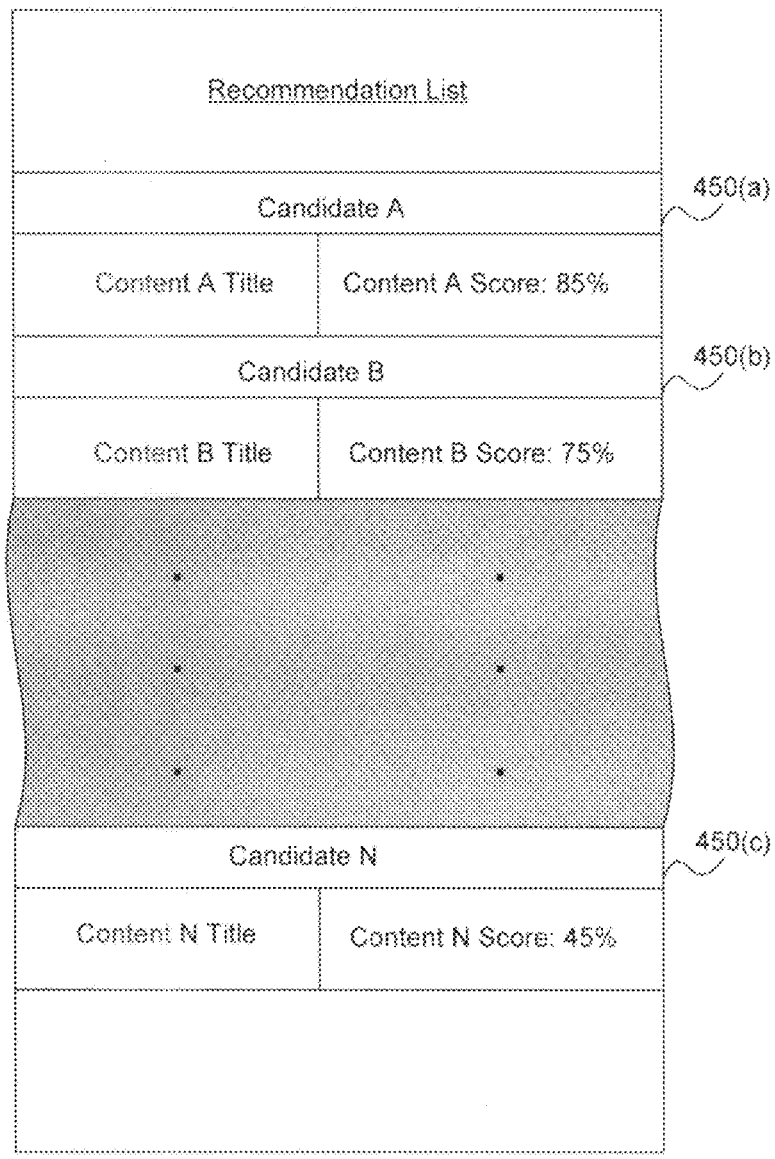
FIG. 4B is a diagram for one embodiment of the recommendation lists of FIG. 4A, in accordance with the present invention.

In the FIG. 4A embodiment, recommendation engine 332 may utilize ranking manager 412 for analyzing various relevant types of individual ranking criteria regarding a device user of a given client device 126 (FIG. 1) to thereby generate a corresponding one of the individual recommendation lists 416. For example, ranking manager 412 may generate an individual recommendation list 416 for a given client device 126 by analyzing client attributes from a corresponding client profile. One embodiment for implementing an individual recommendation list 416 is further discussed below in conjunction with FIG. 4B.

In the FIG. 4A embodiment, recommendation engine 332 may utilize a peer-to-peer statistics module 424 for monitoring and compiling peer-to-peer statistics 428 that reflect any appropriate information and characteristics of peer-to-peer network 134 (FIG. 1B). For example, peer-to-peer statistics 428 may include any desired type of statistical information regarding content transfer procedures for transferring content items directly between client devices 126 in peer-to-peer network 134. In certain embodiments, peer-to-peer statistics module 424 may periodically query client devices 126 to obtain updated peer-to-peer statistics 428.

Alternately, client devices 126 may automatically inform peer-to-peer statistics module 424 regarding any new content transfer procedures, and peer-to-peer statistics module 424 may then update peer-to-peer statistics 428. In the FIG. 4A embodiment, peer-to-peer statistics 428 may be collected for each client device 126, and may include, but are not limited to, peer-to-peer transfer frequency, transferred content types, transfer target devices, transfer source devices, transferred content titles, and any other relevant statistical transfer patterns or information. The functionality and utilization of recommendation engine 332 are further discussed below in conjunction with FIG. 9.

Referring now to FIG. 4B, a diagram for one embodiment of a FIG. 4A recommendation list 416 is shown, in accordance with the present invention. In the FIG. 4B embodiment, recommendation list 416 includes, but is not limited to, a ranked series of candidates 450 that each represent a different content item available to client devices 126. In alternate embodiments, recommendation list 416 may include other components and information in addition to, or instead of, certain of those components and information discussed in conjunction with the FIG. 4B embodiment.

In the FIG. 4B embodiment, recommendation list 416 includes a candidate A 450(a) through a candidate N 450(c) that each has a corresponding content title and content score. For example, the FIG. 4B candidate A 450(a) includes a content A title and a content A score of 85%. In the FIG. 4B embodiment, candidate A 450(a) is therefore the optimal individual candidate based upon the highest content score. In alternate embodiments, particular content items may be identified by any other appropriate content item designation. For example, content items may be identified by a content identification number. In addition, in certain embodiments, ranking indicators for the transfer candidates 450 may be implemented in any other effective manner. For example, a numerical merit indicator other than a percentage may alternately be utilized.

In the FIG. 4B embodiment, a ranking manager 412 of recommendation engine 332 (FIG. 4A) calculates the content scores to generate the ranked recommendation list 416 by analyzing any appropriate types of information. For example, ranking manager 412 may generate a recommendation list 416 for a given client device 126 by analyzing pre-determined ranking criteria that may include device user attributes and client device characteristics from a corresponding client profile.

Furthermore, ranking manager 412 may analyze the pre-determined ranking criteria by utilizing any effective techniques and procedures. For example, in certain embodiments, ranking manager 412 may perform a weighted averaging of the different ranking factors from the ranking criteria to determine a cost function that represents the likelihood of selecting a content item by a device user. Each of the various ranking factors may be associated with a different weighting value that represents the approximate significance of the corresponding ranking factor. The utilization of recommendation lists 416 is further discussed below in conjunction with FIG. 9.

Figure 5:
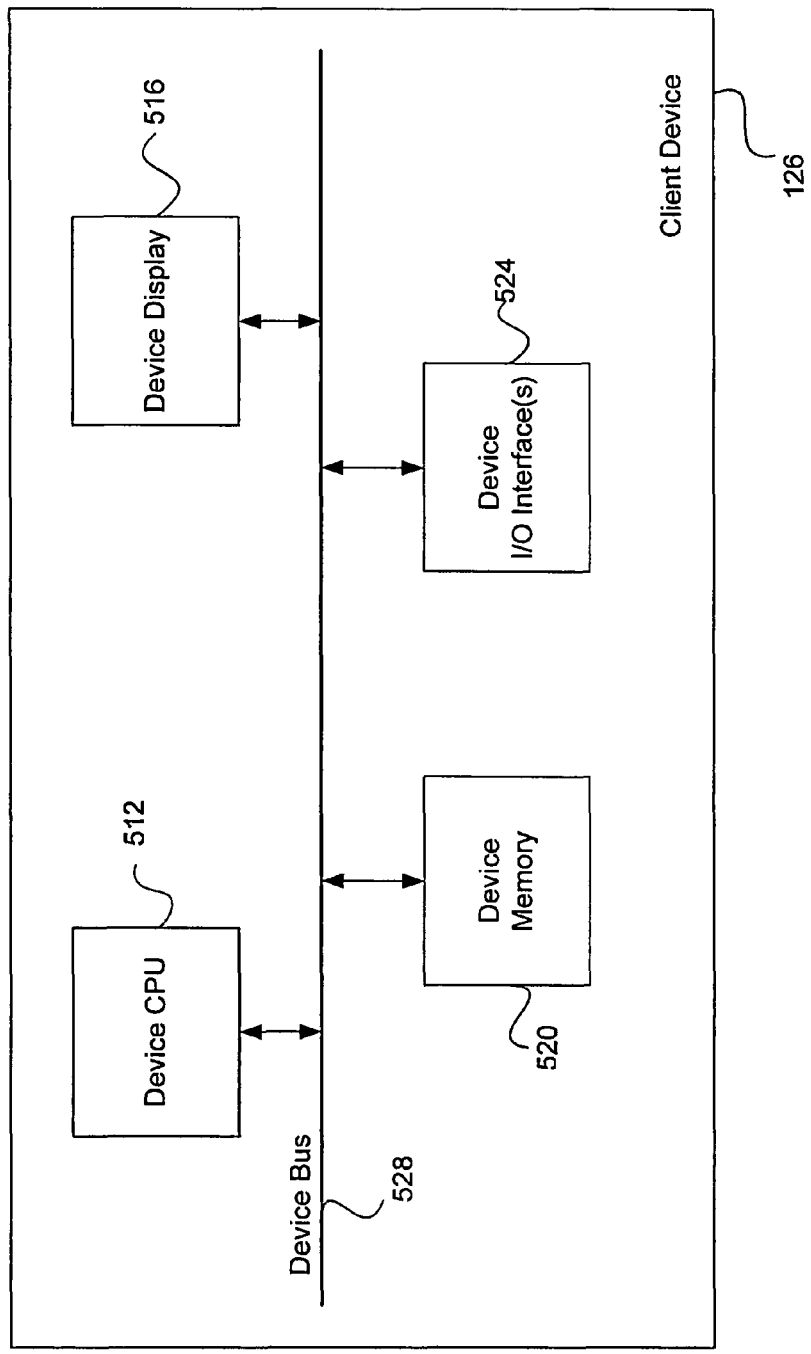
FIG. 5 is a block diagram for one embodiment of a client device from FIG. 1A, in accordance with the present invention.

Referring now to FIG. 5, a block diagram for one embodiment of a FIG. 1A client device 126 is shown, in accordance with the present invention. In the FIG. 5 embodiment, client device 126 may include, but is not limited to, a device central processing unit (device CPU) 512, a device display 516, a device memory 520, and one or more device input/output interface(s) (device I/O interface(s)) 524. The foregoing components of client device 126 may be coupled to, and communicate through, a device bus 528.

In alternate embodiments, client device 126 may be implemented using components and configurations in addition to, or instead of, certain of those components and configurations discussed in conjunction with the FIG. 5 embodiment. Furthermore, in the FIG. 5 embodiment, client device 126 may be implemented as any type of appropriate electronic device. For example, in certain embodiments, client device 126 may be implemented as any type of stationary or portable electronic device, such as a personal computer, a television, a consumer-electronics device, a cellular telephone, a settop box, an audio-visual entertainment device, or a personal digital assistant (PDA).

In the FIG. 5 embodiment, device CPU 512 may be implemented to include any appropriate and compatible microprocessor device that preferably executes software instructions to thereby control and manage the operation of client devices 126. The FIG. 5 device display 516 may include any effective type of display technology including a cathode-ray-tube monitor or a liquid-crystal display device with an appropriate screen for displaying various information to a device user. In the FIG. 5 embodiment, device memory 520 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of device memory 520 are further discussed below in conjunction with FIG. 6.

In the FIG. 5 embodiment, device I/O interface(s) 524 may include one or more input and/or output interfaces to receive and/or transmit any required types of information by client device 126. Device I/O interface(s) 524 may include one or more means for allowing a device user to communicate with other entities in electronic network 110 (FIG. 1A). For example, the foregoing means may include a keyboard device, a wireless remote-control device, a speech-recognition module with corresponding microphone, a graphical user interface with touch-screen capability, a hand-held device controller unit, or a selection button array mounted externally on client device 126. The implementation and utilization of client device 126 are further discussed below in conjunction with FIGS. 8-9.

Figure 6:
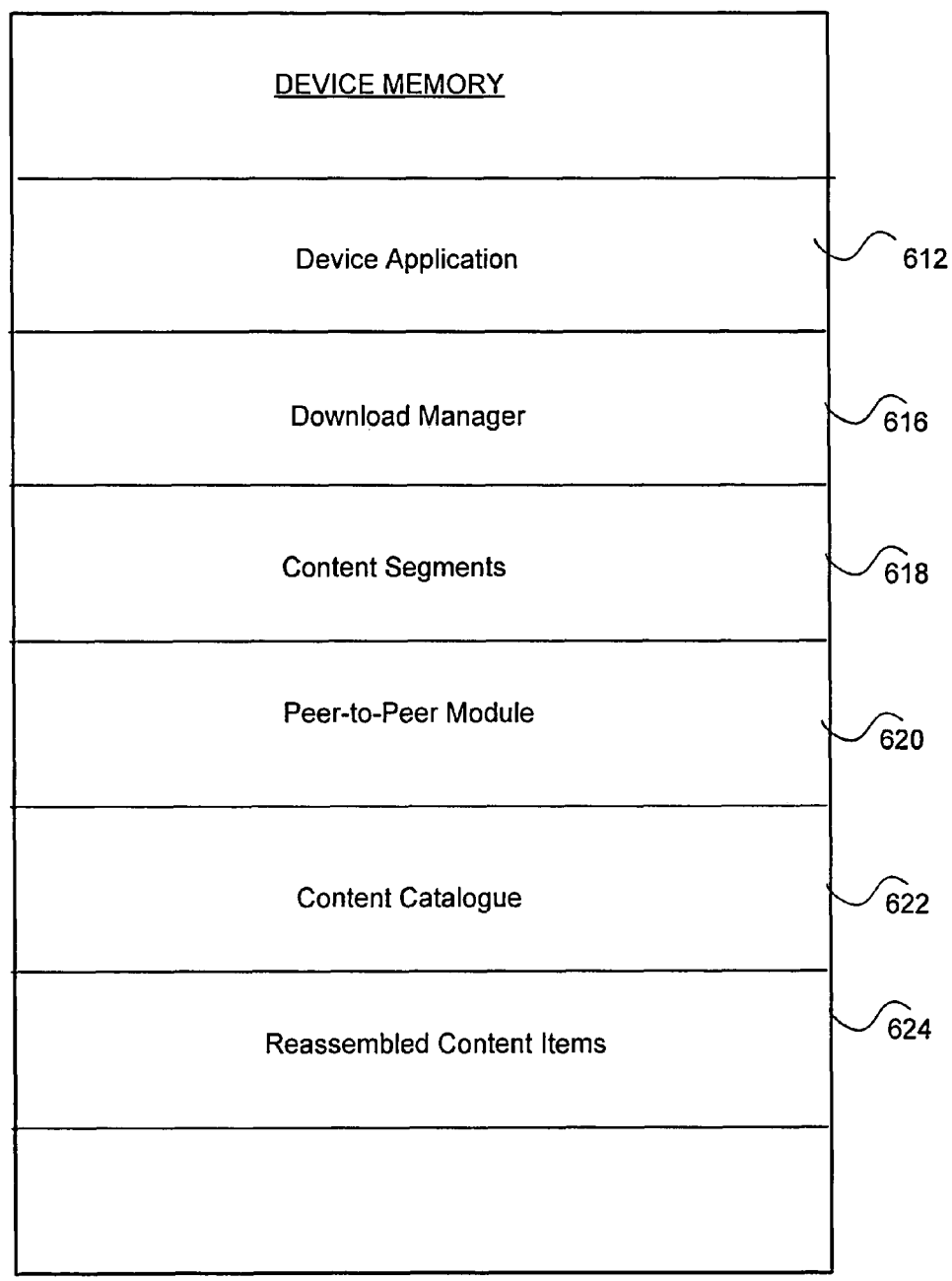
FIG. 6 is a block diagram for one embodiment of the device memory of FIG. 5, in accordance with the present invention.

Referring now to FIG. 6, a block diagram for one embodiment of the FIG. 5 device memory 520 is shown, in accordance with the present invention. In the FIG. 6 embodiment, device memory 520 includes, but is not limited to, a device application 612, a download manager 616, content segments 618, a peer-to-peer module 620, a content catalogue 622, and reassembled content items 624. In alternate embodiments, device memory 520 may include various other components and functionalities in addition to, or instead of, certain of those components and functionalities discussed in conjunction with the FIG. 6 embodiment.

In the FIG. 6 embodiment, device application 612 may include program instructions that are preferably executed by a device CPU 512 (FIG. 5) to perform various functions and operations for a client device 126. The particular nature and functionality of device application 612 typically varies depending upon factors such as the specific type and particular functionality of the corresponding client device 126.

In the FIG. 6 embodiment, download manager 616 may perform communication procedures for exchanging electronic information with external entities by utilizing any appropriate techniques. For example, download manager 616 may coordinate content segment transfer procedures to automatically request, receive and locally store content segments 618 from other client devices 126 in peer-to-peer network 134. In addition, download manager 616 may bi-directionally communicate with tracking server 118 to obtain current location information for specific required content segments 618. Download manager 616 may also perform a content reassembly procedure to reassemble a set of content segments into a complete content item.

In the FIG. 6 embodiment, content segments 618 may include either content segments that were initially preloaded onto a client device 126 during manufacture, or content segments that were subsequently received from other client devices 126. In the FIG. 6 embodiment, peer-to-peer module 620 may be utilized by a particular client device 126 to directly communicate with any other client device 126 in peer-to-peer network 134 (FIG. 2). For example, peer-to-peer module 620 may perform a content segment transfer procedure to download content segments from other client devices 126 in peer-to-peer network 134.

In the FIG. 6 embodiment, content catalogue 622 may include an extensive listing of all content items 422 that are available on client devices 126. Reassembled content items 624 may include complete content items that have been reassembled from individual content segments by performing content reassembly procedures with download manager 616 or other appropriate entities. The utilization and implementation of client device 126 is further discussed below in conjunction with FIGS. 8-9.

Figure 7:
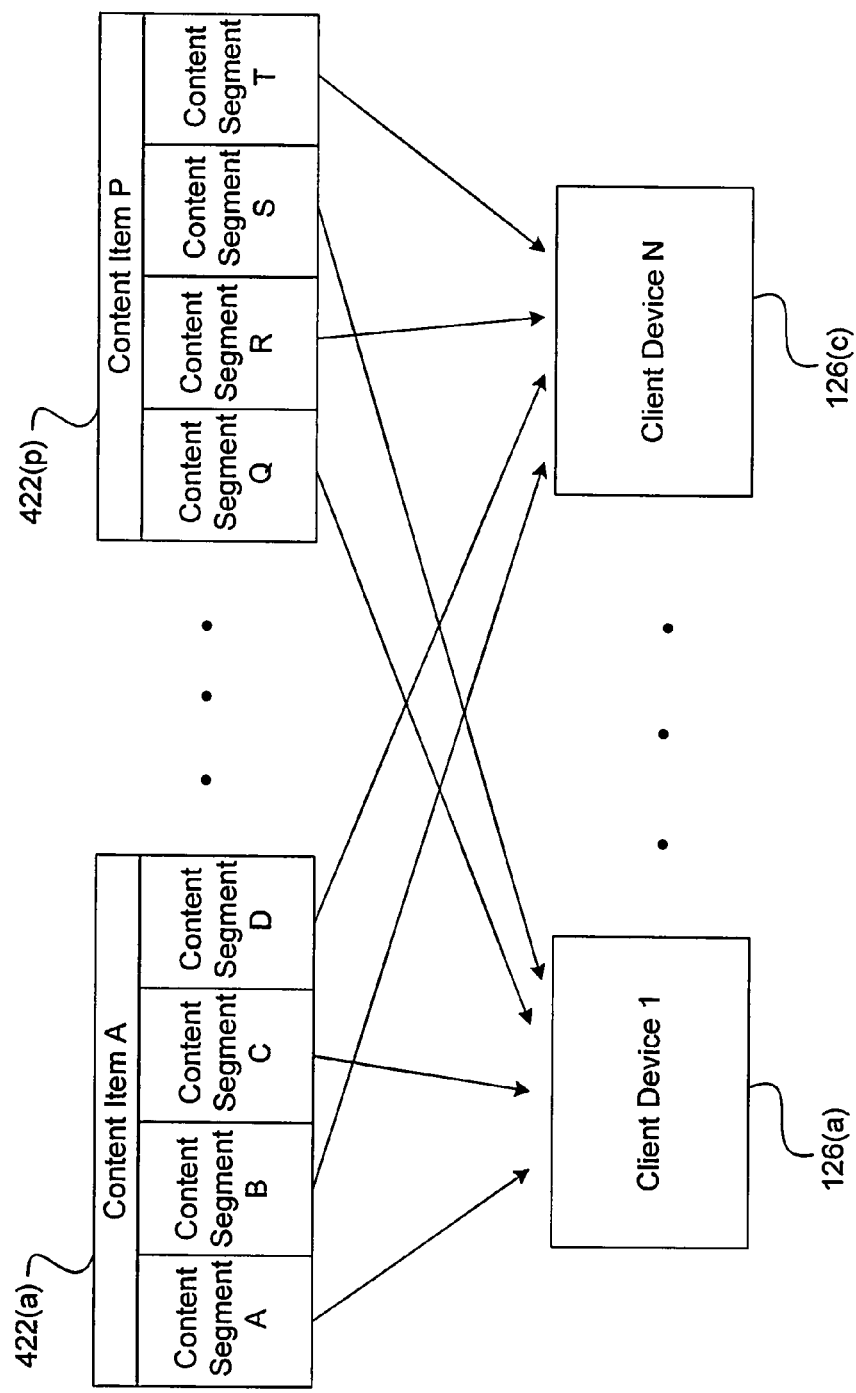
FIG. 7 is a diagram illustrating a segmented content preloading procedure, in accordance with one embodiment of the present invention.

Referring now to FIG. 7, a diagram illustrating a segmented content preloading procedure is shown. The FIG. 7 example is presented for purposes of illustration, and in alternate embodiments, the present invention may support segmented content preloading procedures by with techniques and configurations in addition to, or instead of, certain of those techniques and configurations discussed in conjunction with the FIG. 7 embodiment.

In certain situations, manufacturers of various electronic devices may desire to preload content items 422 onto their electronic devices, and offer some of these content items without cost, so that the system users may be more likely to begin using their services. One limitation of pre-loading entire content items is the physical size of device hard disks, as well as the manufacturing time needed to image the hard disk in the factory. For example, if a manufacturer wishes to preload two high-definition movies onto an electronic device, then the required size of the hard disk to store the movies might be over 200 Gigabytes, and imaging the hard disks would be very time-consuming.

Another problem is that the manufacturer must very carefully choose which content items to pre-load. Because of the large amount of digital data involved, the limited number of content items would likely not satisfy all customers, but might be attractive only to a limited subset of system users. In addition, there are various significant security issues with pre-loaded content items, because customers may be able to extract the content items without any authorization. In certain environments, manufacturers may offer their content items by means of accessing the content items from a content provider or service. However, this option is very expensive because of the high download fees charged by content providers.

In accordance with the FIG. 7 embodiment, instead of preloading entire content items, the content items may be divided into any desired number of different content segments of any appropriate segment size(s). In the FIG. 7 embodiment, for purposes of illustration, the shown content items 422 are both divided into four content segments. Any desired number of different content items 422 may be utilized. In the FIG. 7 example, content item A 422($a$) is divided into four content segments A through D, and content item P 422($p$) is divided into four content segments Q through T. However, the number of different content segments and their corresponding segment sizes is not fixed. Also, all content items 422 need not have the same number or size of content segments. The number and size of content segments per content item 422 may be determined in any effective and optimal manner.

Segmented content preloading procedures may then be performed by selecting and storing a subset of content segments from the various content items 422 onto individual client devices 126. In accordance with the present invention, any desired number of client devices 126 may be utilized. All client devices 126 need not receive content segments. However, each content segment from every content item 422 is preferably preloaded onto at least one client device 126. In the FIG. 7 example, client device 1 (126($a$)) receives content segments A and C from content item A 422($a$) and content segments Q and S from content item P 422($p$). Similarly, client device N 126($c$) receives content segments B and D from content item A 422($a$) and content segments R and T from content item P 422($p$). System users may then browse a complete content catalog of available content items 422 to initiate peer-to-peer transfers for obtaining required content segments for the content items 422 of their choice.

In accordance with the foregoing segmented content preloading procedure, storage capacity (hard disk size) of the client devices 126 does not pose a serious limitation because only a relatively small content segment from every content item 422 is pre-loaded. High-definition content (with greater amounts of image data) may thus be more effectively supported. In addition, the preloaded content may now be personalized to individual user tastes because system users may flexibly select from an extensive content catalogue of contents items, instead of just a few content items that were preloaded in their entirety. With regard to content security issues, the preloaded content segments can not be used to assemble complete content items 422 because initially there are many content segments that are missing from any given client device 126.

In addition, a complete set of content segments from the content items 422 is preloaded in a distributed manner to the various client devices 126. There may therefore be no need for downloading content from content providers, and thus no expensive download fees. Furthermore, as new content items become available, corresponding new content segments may be preloaded onto new client devices 126 for subsequent dissemination to other client devices 126 through peer-to-peer network 134. Certain techniques for advantageously optimizing the reassembly of the various content segments by performing appropriate content segment redistribution procedures are further discussed below in conjunction with FIGS. 8-9.

Figure 8:
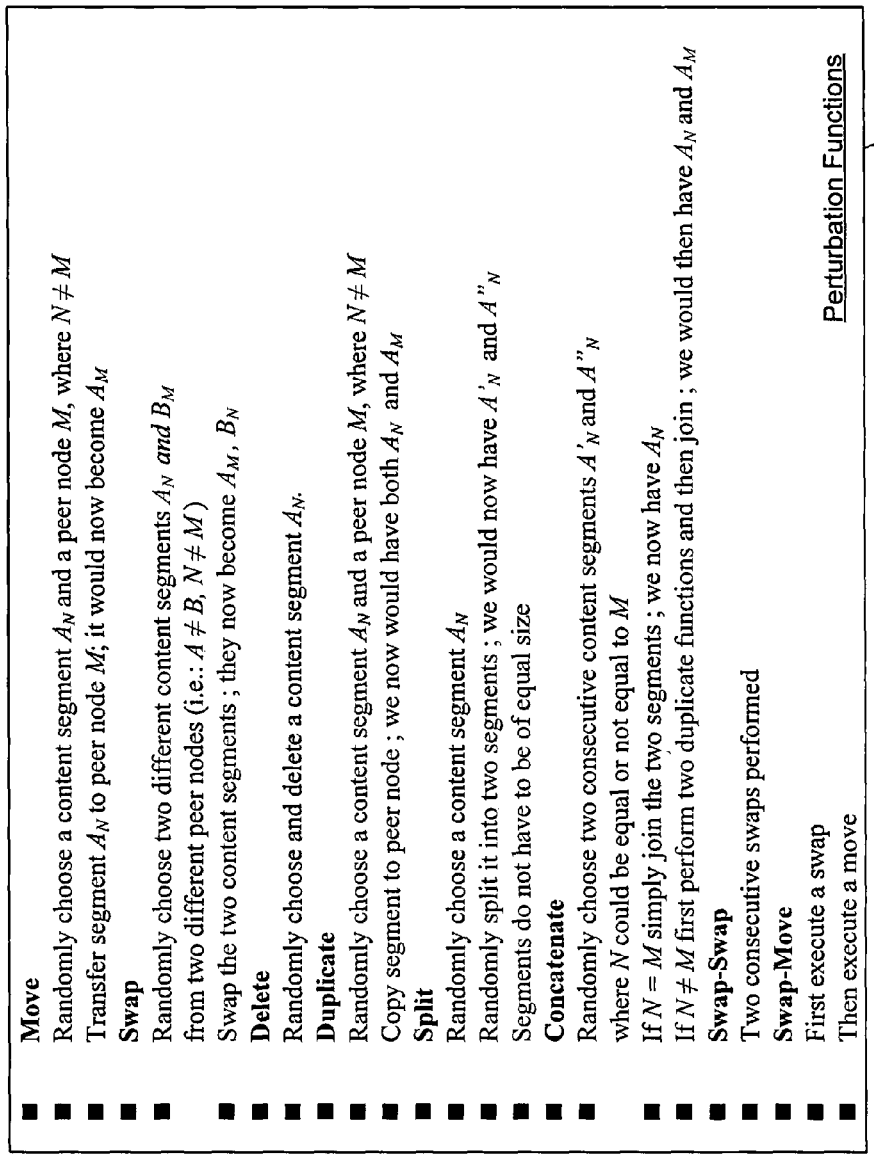
FIG. 8 is a diagram for one embodiment of perturbation functions, in accordance with the present invention.

Referring now to FIG. 8, a diagram of perturbation functions 814 for performing a content segment redistribution procedure is shown, in accordance with one embodiment of the present invention. In alternate embodiments, the present invention may include perturbation functions with components and functionalities in addition to, or instead of, certain of those components and functionalities discussed in conjunction with the FIG. 8 embodiment.

The present invention addresses the problem of time and cost-efficient distribution of electronic content to client devices 126 (FIG. 1) using a peer-assisted content distribution network 134 with partial content preload. This can be achieved by minimizing the economic cost and the distribution time of content delivery. The partial content distribution problem is cast to an optimization framework where the cost function to be minimized is a weighted sum of the economic cost of content delivery and the estimated content delivery time required for delivery of the content. Minimizing the cost of content delivery may be achieved by minimizing expensive Content Distribution Network (CDN) usage from a commercial content distribution entity, and by maximizing zero-cost peer-to-peer (P2P) distribution and reassembly of content items. Minimizing the estimated delivery time may be achieved by re-arranging pre-loaded content segments in such a way that the average distribution time is as short as possible.

In certain embodiments, an optimization module 328 of the tracking server 118 or other appropriate entity may initially gather various network statistics for electronic network 110 (FIG. 1) to calculate network cost functions for content distribution. The network statistics may include any relevant information including, but not limited to, content segment download speeds between client devices 126 (relatively fast), content segment upload speeds between client devices 126 (relatively slow), communication link speeds between client devices 126, on/off times for client devices 126, and the specific financial rates for obtaining content items from one or more external content distribution sources.

In certain embodiments, the content segment reassembly procedures may be performed in either a pull mode or a push mode. In the pull mode, the client devices 126 may request specific content items from content catalogue 622 (see FIG. 6). In the push mode, tracking server 118 may automatically cause client devices 126 to request and reassemble content items based upon recommendations from recommendation engine 332 and other relevant factors. During the content segment redistribution procedures, optimization module 328 may therefore access appropriate recommendation lists 416 to determine likely content reassembly procedures, especially in the foregoing pull mode.

Optimization module 328 may determine the initial content segment distribution in peer-to-peer network 134 by referencing segment locations 320 from tracker module 324. Based upon the gathered network statistics and the current content segment distribution, optimization module 328 may then calculate an initial network cost function that quantifies the cost of content segment downloads for the content reassembly procedures in light of the current segment distribution. In certain embodiments, the network cost function N to be optimized is the weighted sum of the cost of using CDN and the time it would take for the content items to be transferred to devices. The cost weighting value (alpha) and time weighting value (beta) may be selected by a service provider or other entity to choose between low-cost (less CDN) vs. fast delivery. A minimal value of the network cost function would ensure fast content delivery at the lowest cost possible.

In certain embodiments, the network cost function N may be calculated according to the following formula:

$$N = f(P) = \alpha \sum_{c \in C} cost_{CDN}(c) + \beta \sum_{c \in C} time(c)$$

where P is a given content segment distribution, $\alpha$ is a cost weighting factor, $\beta$ is a time weighting factor, c is a content segment, and C is the set of all content segments.

In the FIG. 8 embodiment, optimization module 328 may then solve the cost function minimization problem by iteratively re-arranging content segments amongst clients 126 by applying various perturbation functions 814, and then evaluating the resulting network cost functions. For example, content segments may be deleted, moved from one client device 126 to another, concatenated or duplicated. Recommendation engine 332 may provide a useful input to this optimization framework and may improve the final solution. For example, popular content segments (according to the recommendation engine) may be duplicated, making it faster to distribute to many client devices 126.

In the FIG. 8 embodiments, a certain notation is utilized to indicate a content segment that is stored on a given client device 126. For example, a content segment $A_N$ indicates a content segment A that resides on a client device N. In the FIG. 8 embodiment, perturbations functions 814 may include, but are not limited to, a move function that moves a random content segment from one client device to another client device, a swap function that swaps two randomly chosen content segments, a delete function that deletes a randomly chosen content segment, and a duplicate function that copies a randomly chosen content segment to another client device 126. The perturbation functions 814 may also include, but are not limited to, a split function that splits a randomly chosen content segment into two different content segments, a concatenate function that joins two randomly chose consecutive content segments to form a new unified content segment, a swap-swap function that performs two consecutive swap functions, and a swap-move function that first executes a swap function, and then executes a move function.

Once a selected perturbation function 814 is applied to the appropriate content segment(s), then optimization module 328 may calculate a new current network cost function, as described above. Optimization module 328 may then compare the new current network cost function with the immediately preceding network cost function to determine whether the new content segment redistribution should be accepted as a step toward achieving an optimized content segment configuration.

The optimization problem for seeking the optimal content segment distribution is a combinatorial NP-hard problem. Attempting to find a minimal (optimized) network cost function by brute force/trial-and-error would be extremely burdensome, if not impossible, due in part to the large number of possible content segment distributions. In certain embodiments, optimization module 328 may therefore utilize appropriate stochastic and evolutionary algorithms to obtain a satisfactory (but potentially sub-optimal) solution.

For example, various TSP (Traveling Salesman Problem) techniques may be utilized. In the classic TSP model, a collection of cities and the cost of travel between each pair of them is given, and the cheapest way of visiting all cities and returning to your starting point is calculated. Other techniques may include appropriate genetic algorithms, and ant colony optimization calculations. In certain embodiments, simulated annealing techniques may be utilized in which local minima are avoided by allowing some "bad" moves. The bad moves are gradually decreased in their size and frequency. This technique is modeled after gradually cooling down material in a heat bath, and may be compared to getting a ping-pong ball into the deepest crevice of a bumpy surface (turning around the "hill").

Left alone by itself, the ball will roll into a local minimum. If we shake the surface, we can bounce the ball out of a local minimum. The trick is to shake hard enough to get it out of local minimum, but not hard enough to dislodge it from global one. We start by shaking hard and then gradually reduce the intensity of shaking. Further information regarding simulated annealing may be found in "Optimization By Simulated Annealing," by S. Kirkpatrick, C. D. Gelatt, and M. P. Vecchi, published in Science, Vol. 220, No. 4598, 1983, pp. 671-680.

An annealing schedule and metropolis criterion may be utilized. The annealing schedule starts with a high "temperature" value T. Content segment distribution changes are proposed by applying the perturbation functions 814. Optimization module 328 then evaluates the change in the network cost functions. Proposed changes (new content segment distributions) are accepted if the network cost function N decreases. Proposed changes are also sometimes accepted, even if the network cost function increases, depending upon an acceptance probability value. In certain embodiments, proposed changes that raise the network cost function N are accepted with a probability $e-\Delta N/T$, where $\Delta N$ is a current change in a new network cost function with respect to an immediately preceding network cost function, T is a selectable value (referred to above as "temperature") that is steadily decreased for each iteration of evaluating the successive network cost functions. The value "e" in the acceptance probability value formula is the base of natural logarithms (n) and is approximately equal to 2.718281828.

As optimization module 328 slowly "cools down" the iterative optimization process by gradually lowering the value T, if the value T decreases sufficiently slowly, then the probability of locating a global optimum for the content segment distribution tends to certainty. In certain embodiments, optimization module 328 continues to seek an optimal content segment distribution by reapplying perturbation functions 814 and evaluating the resulting network cost functions until one or more pre-defined stopping criteria are met. The stopping criteria may be selected in any effective manner. For example, one possible stopping criteria may include, but is not limited to, the total number of redistribution iterations performed. One embodiment for performing a content segment redistribution procedure is discussed below in conjunction with FIG. 9A and FIG. 9B.

Figure 9A:
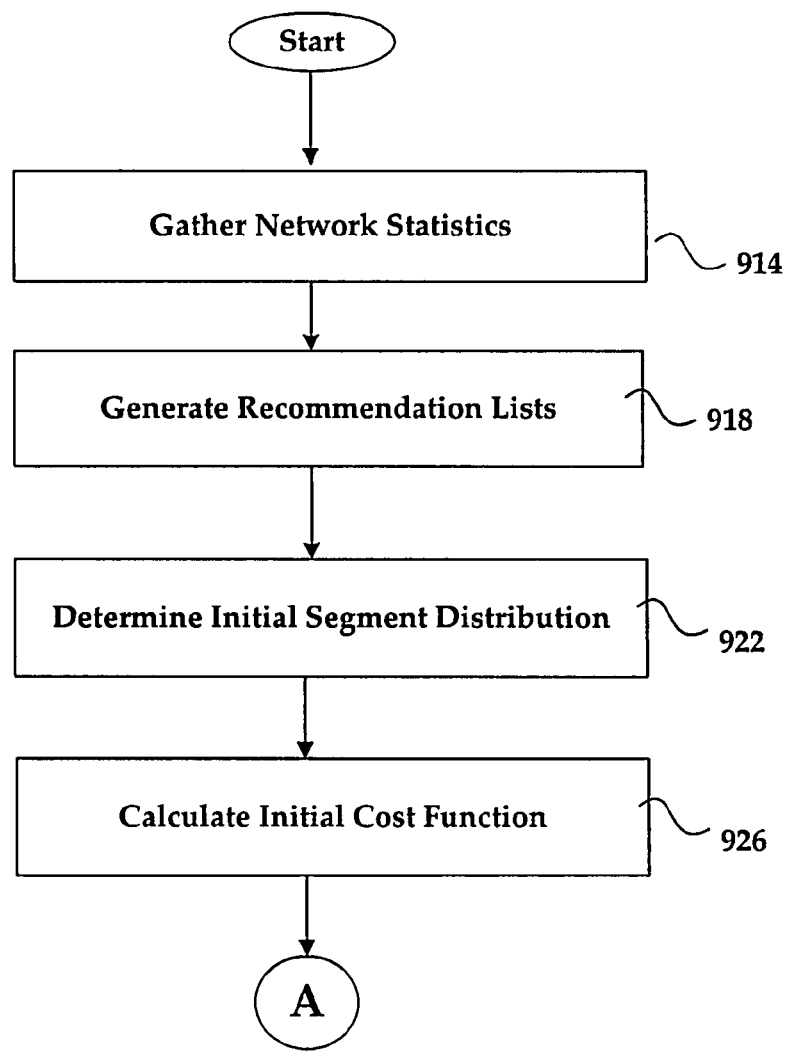
FIGS. 9A and 9B are a flowchart of method steps for performing a content segment redistribution procedure, in accordance with one embodiment of the present invention.
Figure 9B:
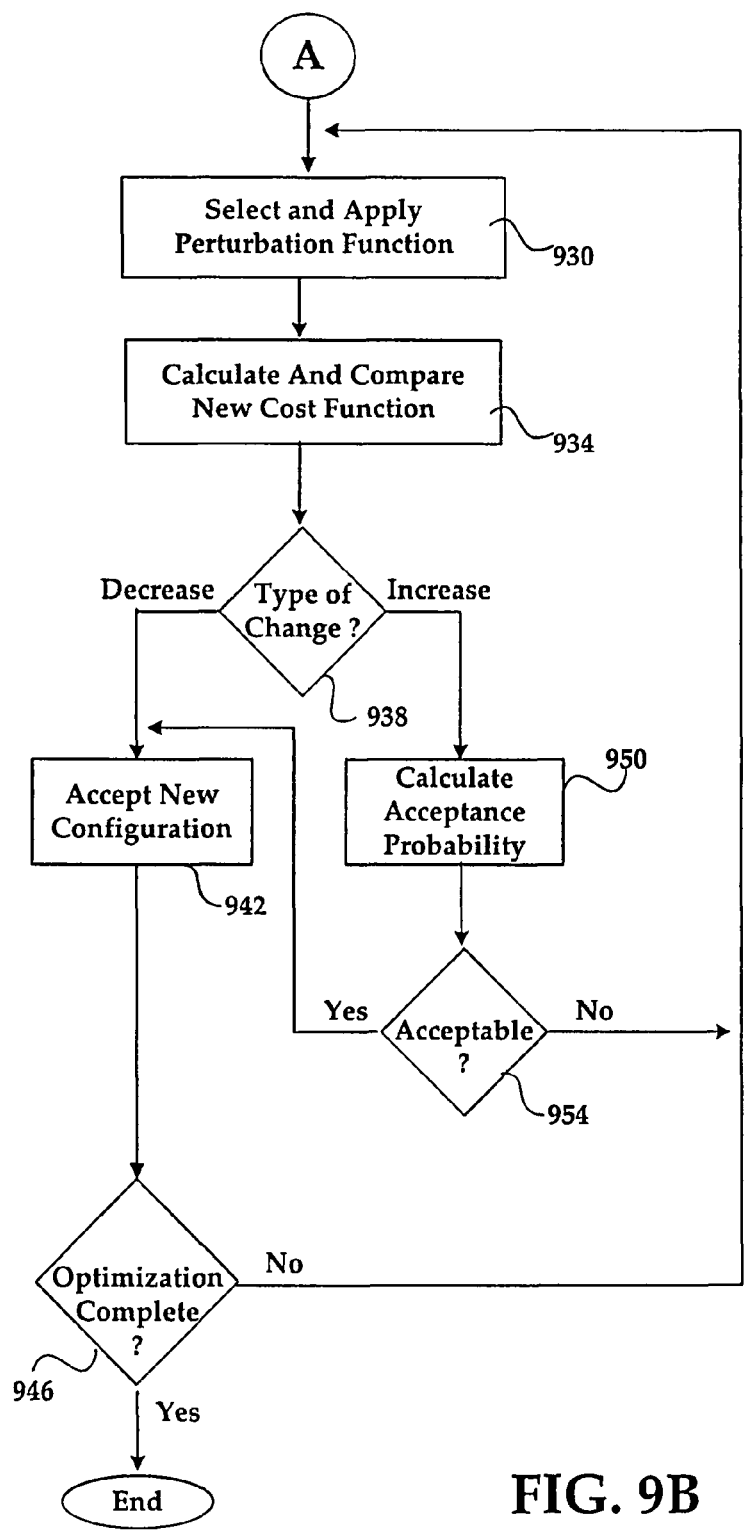

Referring now to FIGS. 9A and 9B, a flowchart of method steps for performing a content segment redistribution procedure is shown, in accordance with one embodiment of the present invention. The flowchart of FIGS. 9A and 9B is presented for purposes of illustration, and in alternate embodiments, the present invention may utilize steps and sequences other than those steps and sequences discussed in conjunction with the embodiment of FIGS. 9A and 9B.

In the FIG. 9A embodiment, in step 914, a tracking server 118 (FIG. 1) or other appropriate entity initially gathers network statistics regarding client devices 126 in a peer-to-peer network 134. The network statistics may be any relevant information, including data transfer speeds between the various client devices and content download fees for obtaining content items from an external content source. In step 918, a recommendation engine 332 may be utilized to generate one or more recommendation lists 416 for client devices 126. In step 922, an optimization module 328 of the tracking server 324 or other entity determines an initial content segment distribution on the client devices 126 of peer-to-peer network 134.

Based upon the current content segment distribution and the previously-determined network statistics, optimization module 328 may then calculate a network cost function to quantify the current level of optimization of client devices 126 with respect to performing content segment reassembly procedures for producing complete content items from the distributed content segments. In step 930, optimization module 328 may then select and apply one or more previously defined perturbation functions 814 to the content segments on client devices 126 to produce a new distribution of content segments on client devices 126.

In step 934, optimization module 328 calculates a new network cost function based upon the current distribution of content segments on client devices 126. In step 934, optimization module 328 also compares the newly-calculated network cost function with the immediately preceding network cost function. In step 938, optimization module 328 evaluates the type of change in the current network cost function (increasing or decreasing). In step 942, if the newly-calculated network cost function has decreased with respect to the immediately preceding network cost function, then optimization module 328 accepts the new distribution of content segments on client devices 126. In step 946, optimization module 328 determines whether the optimization process is complete by utilizing pre-defined stopping criteria. If the optimization process is not complete, then the FIG. 9B process iteratively returns to step 930, and applies/evaluates additional perturbation functions 814. Alternately, if the optimization process is complete, then the FIG. 9B. process may terminate.

However, if the newly-calculated network cost function has increased in foregoing step 938, then in step 950, optimization module 328 calculates an acceptance probability value based upon predefined acceptance factors. In step 954, optimization module 328 evaluates the acceptance probability value to determine whether to accept the new distribution of content segments on client devices 126. If the acceptance probability value is not acceptable, then the FIG. 9B process iteratively returns to step 930, and applies/evaluates additional perturbation functions 814. Alternately, in step 954, if the acceptance probability value is acceptable, then in step 942, optimization module 328 accepts the new distribution of content segments on client devices 126. In step 946, optimization module 328 determines whether the optimization process is complete by utilizing pre-defined stopping criteria. If the optimization process is not complete, then the FIG. 9B process iteratively returns to step 930, and applies/evaluates additional perturbation functions 814. Alternately, if the optimization process is complete, then the FIG. 9B. process may terminate. For at least the foregoing reasons, the present invention therefore provides an improved system and method for effectively optimizing content segment downloads in an electronic network.

The invention has been explained above with reference to certain embodiments. Other embodiments will be apparent to those skilled in the art in light of this disclosure. For example, the present invention may readily be implemented using certain configurations and techniques other than those described in the specific embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for optimizing content distribution in an electronic network, comprising:
    client devices that are configured to locally store content segments of content items in a distributed manner, said client devices accessing required content segments from other ones of said client devices for performing content reassembly procedures to produce required ones of said content items; and
    an optimization module stored on a non-transitory computer-readable medium that iteratively redistributes said content segments among said client devices to seek a content segment configuration of said content segments that optimizes performance characteristics of said content reassembly procedures, said optimization module iteratively calculating network cost functions that quantify said performance characteristics of said client devices during said content reassembly procedures, said network cost functions being approximately equal to weighted sums of financial costs for obtaining said content items directly from an external content distributor plus estimated content segment delivery times for performing said content reassembly procedures, said optimization module iteratively redistributing said content segments into a current configuration by randomly applying perturbation functions to one or more of said content segments on said client devices, said perturbation functions being predefined to include a move function that moves a random content segment from one of said client devices to another one of said client devices, a swap function that swaps two randomly chosen ones of said content segments, a delete function that deletes a first randomly chosen content segment, and a duplicate function that copies a second randomly chosen content segment to another one of said client devices, a split function that splits a third randomly chosen content segment into two different content segments, a concatenate function that joins two randomly chosen consecutive content segments to form a new unified content segment, a swap-swap function that performs two consecutive swap functions, and a swap-move function that first executes said swap function, and then executes said move function.

2. A method for optimizing content distribution in an electronic network, comprising the steps of:

configuring client devices to locally store content segments of content items in a distributed manner;

utilizing an optimization module for iteratively redistributing said content segments among said client devices to seek an optimal content segment configuration for said content segments; and transferring required ones of said content segments to one of said client devices from other ones of said client devices for performing a content reassembly procedure to produce a required one of said content items, said optimal content segment configuration optimizing performance characteristics of said content reassembly procedure, said optimization module iteratively calculating network cost functions that quantify said performance characteristics of said client devices during said content reassembly procedures, said network cost functions being approximately equal to weighted sums of financial costs for obtaining said content items directly from an external content distributor plus estimated content segment delivery times for performing said content reassembly procedures, said optimization module iteratively redistributes said content segments into a current configuration by randomly applying perturbation functions to one or more of said content segments on said client devices, said perturbation functions being predefined to include a move function that moves a random content segment from one of said client devices to another one of said client devices, a swap function that swaps two randomly chosen ones of said content segments, a delete function that deletes a first randomly chosen content segment, and a duplicate function that copies a second randomly chosen content segment to another one of said client devices, a split function that splits a third randomly chosen content segment into two different content segments, a concatenate function that joins two randomly chosen consecutive content segments to form a new unified content segment, a swap-swap function that performs two consecutive swap functions, and a swap-move function that first executes said swap function, and then executes said move function.

3. A system for optimizing content distribution in an electronic network, comprising:

a plurality of means for locally storing content segments of content items in a distributed manner;

means for iteratively redistributing said content segments among said means for locally storing to seek an optimal content segment configuration for said content segments, said means for iteratively redistributing being stored on a non-transitory computer-readable medium; and means for transferring required ones of said content segments to one of said means for locally storing from other ones of said means for locally storing for performing a content reassembly procedure to produce a required one of said content items, said optimal content segment configuration optimizing performance characteristics of said content reassembly procedure, said means for iteratively redistributing iteratively calculating network cost functions that quantify said performance characteristics of said means for transferring during said content reassembly procedures, said network cost functions being approximately equal to weighted sums of financial costs for obtaining said content items directly from an external content distributor plus estimated content segment delivery times for performing said content reassembly procedures, said means for iteratively distributing iteratively redistributing said content segments into a current configuration by randomly applying perturbation functions to one or more of said content segments on said means for locally storing, said perturbation functions being predefined to include a move function that moves a random content segment from one of said means for locally storing to another one of said means for locally storing, a swap function that swaps two randomly chosen ones of said content segments, a delete function that deletes a first randomly chosen content segment, and a duplicate function that copies a second randomly chosen content segment to another one of said means for locally storing, a split function that splits a third randomly chosen content segment into two different content segments, a concatenate function that joins two randomly chosen consecutive content segments to form a new unified content segment, a swap-swap function that performs two consecutive swap functions, and a swap-move function that first executes said swap function, and then executes said move function.

\* \* \* \* \*